United States Patent [19]

Tangonan

[11] Patent Number: 4,901,305
[45] Date of Patent: Feb. 13, 1990

[54] DISTRIBUTED CROSSBAR SWITCH

[76] Inventor: Gregory L. Tangonan, 141 Santa Rosa, Oxnard, Calif. 93035

[21] Appl. No.: 138,619

[22] Filed: Dec. 28, 1987

[51] Int. Cl.$^4$ .............................................. H04B 9/00
[52] U.S. Cl. ........................................ 370/1; 455/600; 455/607; 455/612; 455/617
[58] Field of Search ............... 455/600, 606, 607, 612, 455/617, 618, 619; 250/551; 370/1

[56] References Cited

U.S. PATENT DOCUMENTS

| | | | |
|---|---|---|---|
| 3,883,222 | 5/1975 | Gunderson | 350/96 C |
| 4,062,043 | 12/1977 | Zendler | 455/612 |
| 4,074,142 | 2/1978 | Jackson | 250/551 |
| 4,165,225 | 8/1979 | Auracher et al. | 455/612 |
| 4,630,254 | 12/1986 | Tseng | 455/607 |
| 4,696,059 | 9/1987 | McDonald | 455/600 |
| 4,707,062 | 11/1987 | Abe et al. | 350/96.16 |
| 4,723,309 | 2/1988 | Mochizuki | 455/612 |
| 4,748,614 | 5/1988 | Dammann | 370/1 |

FOREIGN PATENT DOCUMENTS

| | | | |
|---|---|---|---|
| 0161683 | 11/1985 | European Pat. Off. | 455/600 |
| 0216167 | 4/1987 | European Pat. Off. | |
| 2454633 | 11/1980 | France | |
| 0184997 | 8/1986 | Japan | 370/4 |

OTHER PUBLICATIONS

W. J. Tomlinson et al., "Telecommunications Applications of Integrated Optics and Optoelectronics", Proceedings of the IEEE, vol. 75, No. 11, New York, pp. 1512-1523.

Primary Examiner—Robert L. Griffin
Assistant Examiner—L. Van Beek

[57] ABSTRACT

The Invention provides a locally distributed crossbar switch to optically connect many computer processors and memories in arbitrary permutation an without interruption. A process or and an associated memory can be packaged together, taking advantage of the fact that the distributed crossbar switch employs local switching. At the same time, processor-memory pairs can be physically separated from other such processor-memory pairs, and by great distance.

8 Claims, 2 Drawing Sheets

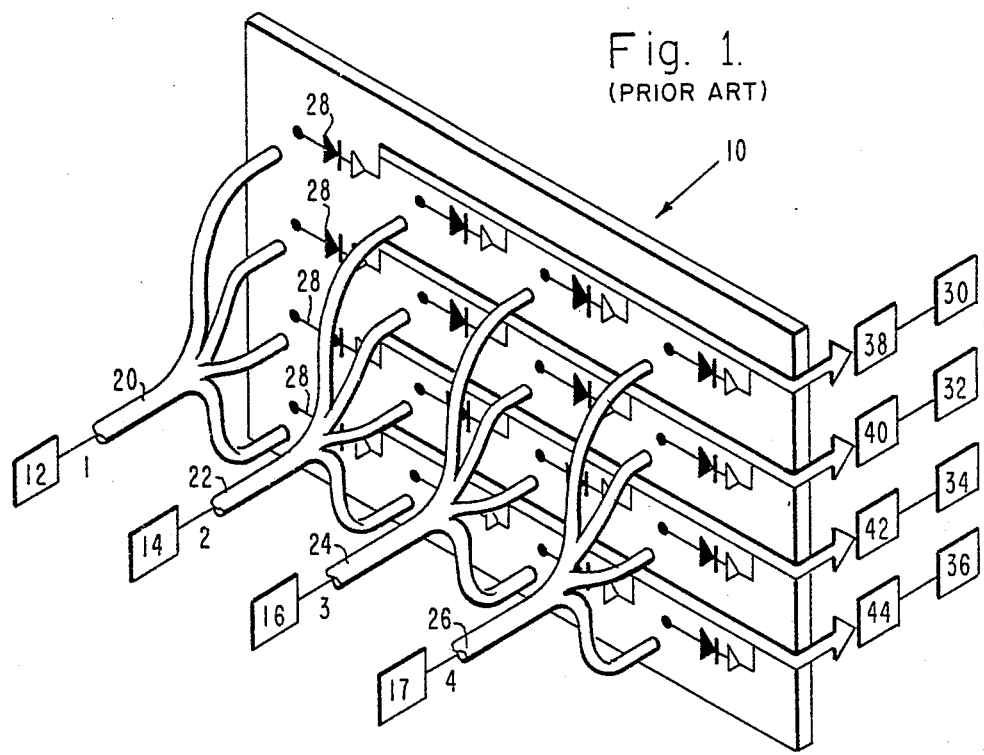
Fig. 1.
(PRIOR ART)
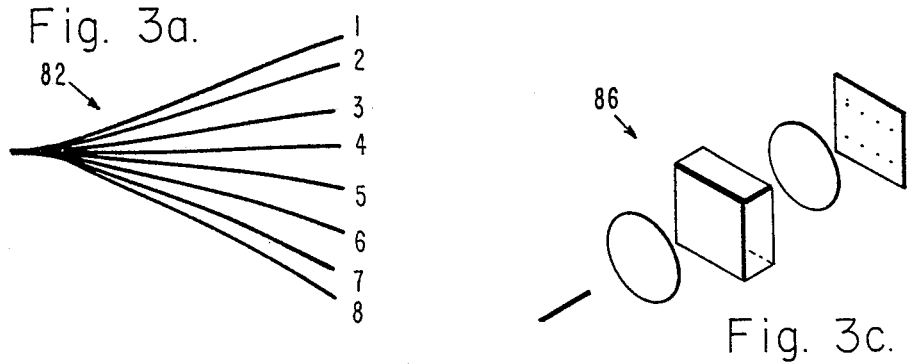
Fig. 3a.
Fig. 3c.
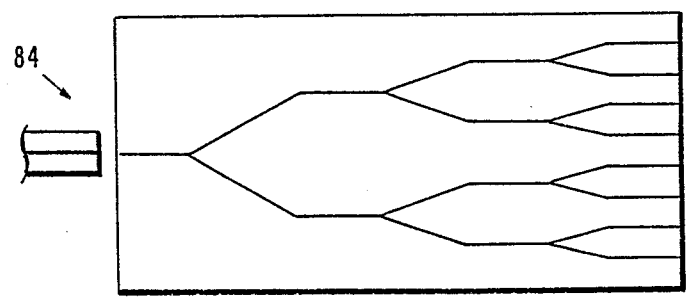
Fig. 3b.

DISTRIBUTED CROSSBAR SWITCH

ORIGIN OF THE INVENTION

The U.S. Government has rights in this application pursuant to Contract No. N 6601-86-C-0010 with the Department of the Navy.

BACKGROUND OF THE INVENTION

1. Field of Invention

This invention relates to communication networks between computer processors and memories.

2. Description of the Related Art

Computer architectures now commonly comprise a large number of processors executing programs concurrently. Such parallel computing architectures require a communication network between processors and between processors and memories. In parallel processing systems, it is desirable to allow many processors to send information to the processors and/or memories simultaneously.

The use of optics for the communication network is particularly effective, since optical systems can provide appropriate inherent parallelism, suitable bandwidths and low interaction between separate beams in a linear medium.

One of the most important optical communication networks utilizes the well known crossbar network. In particular, the crossbar network allows all processors and/or memories to be dynamically interconnected in an arbitrary permutation, without moving any existing interconnections.

Attention is now directed to FIG. 1 which exemplifies a "star" crossbar network 10 that utilizes opto-electronic detection components. The crossbar network 10 is disclosed in MacDonald et al, Electron Lett. 16 (1978) 402. The disclosure is incorporated herein by reference. The crossbar network 10 includes four transmitters, 12, 14, 16 and 18, each of which transmitters may be considered to be run by a processor. The transmitters provide input signals which are routed on optical fibers 20, 22, 24, and 26. The four separate inputs 20, 22, 24, 26, are in turn, fanned out four times and then made incident on 16 separate detectors 28. Each of the detectors 28 comprises a photodetector connected in series with a preamplifier, and each detector 28 provides the same electronic function, namely, to serve as a switching element. Briefly, each of the detectors 28 inputs light, and outputs an electrical signal on instruction from bias control circuitry (not shown). In operation, therefore, the crossbar network 10 functions to allow selection of a particular transmitted input signal for rebroadcast to a desired output (a memory or processor unit), shown in FIG. 1 as receivers 30, 32, 34, and 36. This rebroadcasting further requires a conversion of the electrical signals to optical signals by way of optical repeaters 38, 40, 42, 44, and transmission over a return fiber line.

BRIEF DESCRIPTION OF THE DRAWING

The invention is illustrated in the accompanying drawing, in which

FIG. 1 is a circuit diagram of a prior art opto-electronic crossbar switch;

FIGS. 3a, b, c provide schematics of a fanout-reformatter employed in the present invention.

DETAILED DESCRIPTION OF THE INVENTION

Figure 2:
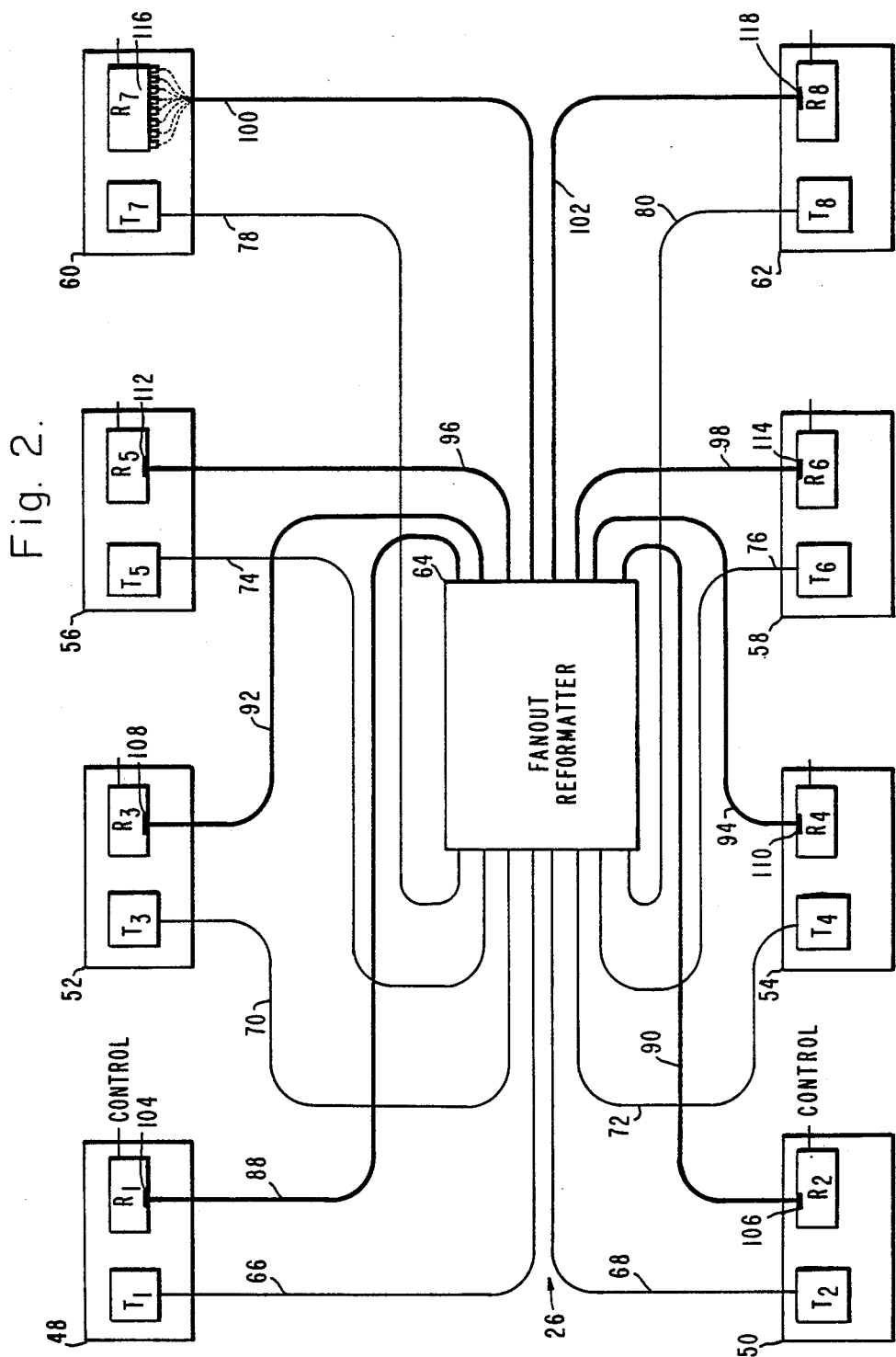
FIG. 2 is a circuit diagram for the circuit used in the present invention.

The need in the art is addressed by the distributed switching assembly of the present invention which includes N transmitter-receiver pairs, each receiver comprising a switched array of N detectors for detecting and selecting a particular transmitted signal. An optical fiber network is included for linking a transmitter and a receiver through a fanout reformatter. The fanout reformatter accepts a signal output from each transmitter by way of the optical fiber network; fans out the signal output from each transmitter from 1 to N branches and reformats all of the Kth branches, where K is from 1 to N, from each transmitter. The reformatter thus provides N inputs to the Kth receiver by way of the optical fiber network.

Attention is now directed to FIG. 2 which shows an assembly 46 of the present invention. The assembly 46 includes 8 pairs of transmitter-receiver units packaged together, numerals 46-62, and a fan-out reformatter 64. The fan-out reformatter 64 can accept a signal output from each of the transmitters that is routed along optical fibers 66-80. The fan-out reformatter 64 reformats the input optical fibers 66-80 in the following way.

To start, the optical fiber 66 from the first transmitter is split into 8 branches. The splitting may be done in accordance with the splitting scheme shown in FIG. 3. For example, FIG. 3a shows that the optical fiber can be split from 1 to 8 branches using a half-star coupler 82 structure. FIG. 3b shows that the optical fiber can be split from 1 to 8 branches using a planar network 84 structure. FIG. 3c shows that the optical fiber can be split from 1 to 8 branches using a cross-phase grating 86 structure. Thus, in all these cases, an exemplary structure is shown for splitting an input optical fiber into 8 branches. Continuing, the input optical fiber 68 from the second transmitter is split into 8 branches, again using, equivalently, any of the structures shown in FIG. 3. Further, and in the same manner, each of the input optical fibers 70, 72, 74, 76, 78 and 80 from the remaining 6 transmitters are split into 8 branches, again in accordance with the FIG. 3 structures. At this stage, therefore, there are 8 input groups of 8 branches each, or 64 total branches.

As indicated above, reformatting involves gathering the 64 branches in an appropriate manner to form a cable for input to the receivers. This is done as follows. To start, the first branch from each of the 8 input groups is bundled together, using the reverse of any of the structural branching techniques shown in FIG. 3. This procedure therefore establishes a first cable comprising the first branch from all of the 8 input groups. The first cable, shown in FIG. 2 as optical fiber 88, is routed to the first receiver. Continuing, the second branch from each of the 8 input groups is bundled together, again using the reverse of any of the structural branching techniques shown in FIG. 3. This procedure therefore establishes a second cable comprising the second branch from all of the 8 input groups. The second cable, shown in FIG. 2 as optical fiber 90, is routed to the second receiver. Further, and in the same manner, the third, fourth, fifth, sixth, seventh and eighth branches from each of the 8 input groups, are individually bundled together by way of the structural techniques shown in FIG. 3. This procedure, accordingly, establishes 6 more cables, shown in FIG. 2 as optical fibers 92-102. The optical fibers 92-102 are routed, respectively, to the third through eighth receivers.

At this point, each of the 8 receivers has an input fiber optic cable comprising 8 separate branches bundled together. The fiber optic cable in each receiver is inputed to the opto-electronic detectors that form part of the receiver. The 8 opto-electronic detector units shown in FIG. 2 are indicated by numerals 104-108. The switched array of N detectors 116 forming part of receiver $R_7$ is shown in FIG. 2. Likewise, each of the other receivers $R_1$, $R_2$, $R_3$, $R_4$, $R_5$, $R_6$ and $R_8$ have switched arrays of N detectors (not shown). Each of the 8 opto-electronic detector units 104-118, in turn, address the 8 separate branches that are bundled together and inputted to each receiver. Each of the 8 detector units 104-118 comprise conventional electrical signal summation/amplification, optical signal regeneration, and a switch controller (not shown). As indicated above, each of the 8 opto-electronic detector units 104-118 provides selection for a particular desired transmitter signal, one to eight, to be received by a particular desired receiver, one to eight.

What is claimed is:

1. A distributed switching assembly, comprising:
   (a) N transmitter-receiver pairs, wherein each receiver comprises a switched array of N detectors for detecting and selecting a particular transmitted signal, wherein each transmitter-receiver pair is packaged together;
   (b) optical fiber routing means for linking a transmitter and a receiver through
   (c) fanout reformatter means for:
      (i) accepting a signal output from each transmitter by way of the optical fiber routing means;
      (ii) fanning out the signal output from each transmitter from 1 to N branches; and
      (iii) reformatting all of the Kth branches, where K is from 1 to N, from each transmitter for providing N inputs to the Kth receiver by way of the optical fiber routing means.

2. A switching assembly according to claim 1, wherein the fanout reformatter is passive.

3. A switching assembly according to claim 2, wherein the fanout-reformatter comprises a fused half-star coupler.

4. A switching assembly according to claim 2, wherein the fanout-reformatter comprises a planar waveguide structure.

5. A switching assembly according to claim 2, wherein the fanout-reformatter comprises crossed phase gratings.

6. A switching assembly according to claim 1, wherein each of the transmitter-receiver pairs is separated from the other pairs by at least 100 meters.

7. A switching assembly according to claim 1, wherein at least one transmitter outputs an asynchronous signal.

8. A switching assembly according to claim 1, wherein N is 2 to 256.

* * * * *

UNITED STATES PATENT AND TRADEMARK OFFICE
CERTIFICATE OF CORRECTION

PATENT NO. : 4,901,305

DATED : February 13, 1990

INVENTOR(S) : Gregory L. Tangonan

It is certified that error appears in the above-identified patent and that said Letters Patent is hereby corrected as shown below:

On the title page:
LIST THE ASSIGNEE as HUGHES AIRCRAFT COMPANY, LOS ANGELES, CALIFORNIA;

IN THE ABSTRACT, line 1, change the word "Invention" to lower case --invention--;

line 3, delete "an" and insert therfor --and--; and line 4, after "process" delete the word "or".

CORRECT THE CONTRACT NO. in the section entitled ORIGIN OF THE INVENTION, column 1, line 2, to read as --N66001-86-C-0110--.

Signed and Sealed this

Twenty-second Day of September, 1992

Attest:

DOUGLAS B. COMER

*Attesting Officer*   *Acting Commissioner of Patents and Trademarks*